Feb. 25, 1969 A. M. APICELLA, JR., ET AL 3,430,216

MEMORY ELEMENT WITH A SELECTIVE NON-READOUT CHARACTERISTIC

Filed Sept. 27, 1965

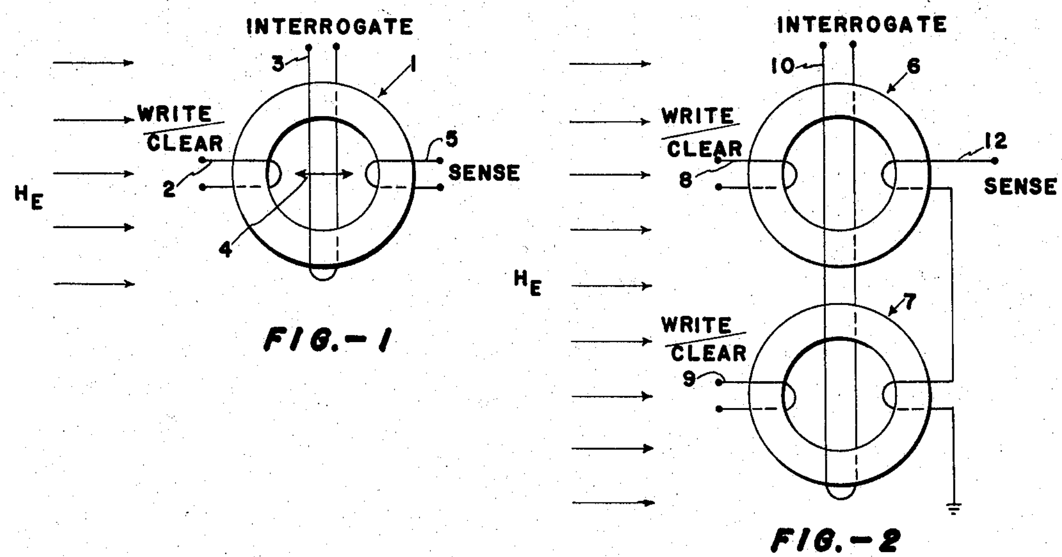

FIG. 1, FIG. 2

FIG. 3

| CASE | INTERROGATE | CORE 6 | CORE 7 | OUTPUT |
| --- | --- | --- | --- | --- |
| 1 | A | B | CARE | PLUS |
| 2 | $\bar{A}$ | $\bar{B}$ | CARE | PLUS |
| 3 | A | $\bar{B}$ | CARE | MINUS |
| 4 | $\bar{A}$ | B | CARE | MINUS |
| 5 | A | B | DON'T CARE | ZERO |
| 6 | A | B | DON'T CARE | ZERO |
| 7 | $\bar{A}$ | $\bar{B}$ | DON'T CARE | ZERO |
| 8 | $\bar{A}$ | $\bar{B}$ | DON'T CARE | ZERO |

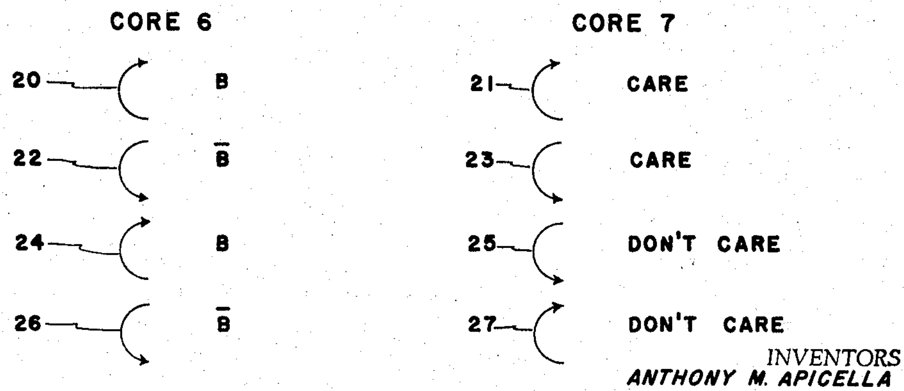

FIG. 4

INVENTORS
ANTHONY M. APICELLA JR.
NORMAN L. BOLING
JOHN T. FRANKS JR.

ATTORNEY

United States Patent Office 3,430,216
Patented Feb. 25, 1969

3,430,216

MEMORY ELEMENT WITH A SELECTIVE NON-READOUT CHARACTERISTIC

Anthony M. Apicella, Jr., Massillon, and Norman L. Boling and John T. Franks, Jr., Akron, Ohio, assignors to Goodyear Aerospace Corporation, Akron, Ohio, a corporation of Delaware Filed Sept. 27, 1965, Ser. No. 490,496
U.S. Cl. 340—174 4 Claims
Int. Cl. G11b 5/00

ABSTRACT OF THE DISCLOSURE

The invention consists of two single aperture memory storage elements which operate as a single unit so that separate flux pattern signals may be stored as information in each of the elements, but which elements are readout by a common source set for series signal detection whereby when similar bits of information are stored in the separate cores readout will be achieved, but where opposite bits of information are stored the readouts will cancel providing no readout. The write-in information is selective, and hence readout can be selectively controlled by simply controlling the information stored in one of the two bits. This selective readout characteristic is a desirable feature in associative memory operation.

This invention relates to a memory device which can perform the logical "Exclusive OR" or "Equality" functions which can also provide non-readout as selectively desired, and more particularly to a magnetic device which can be used to perform an associative memory operation, or be selectively blocked out to provide no readout, as desired.

Heretofore, the use of standard single aperture cores in digital memory storage systems has been well known. Further, the technique of cross-field switching to achieve a non-destructive readout of the information stored in the core has been well known. The adaptation of cross-field switching with single aperture cores to provide the "Exclusive OR" or "Equality" functions is described in a patent application entitled, "Externally Biased High Speed Non-Destructive Memory Element Adapted for Associative Memory," filed Aug. 6, 1964, Ser. No. 387,824 and assigned to Goodyear Aerospace Corporation. However, there are certain times in performing associative memory when it is desirable to blank out certain portions of a word in memory, or a particular compare word, for many varied reasons. A simple, efficient, and inexpensive means to provide block out or non-readout of an individual memory storage element is needed and will provide an added flexibility to an association memory system.

It is the general object of the invention to meet the needs of the art with reference to memory storage devices by providing a device which consists of two single aperture elements which operate as a single unit where separate signals may store information in the elements, but which are readout by a common source set for series readout whereby if similar bits of information are stored in the separate cores, a readout will be achieved, but where opposite bits of information are stored, the readouts will cancel providing no readout.

A further object of the invention is to provide a simple memory storage device utilizing two single aperture elements whereby the readout of one element is dependent upon the information stored in the other, and where the information stored in both elements is independently induced to selectively provide for readout or not as desired.

Another object of the invention is to provide a simple memory storage element which may be selectively readout or not as desired, which element is extremely simple, highly effective, and inexpensive.

The aforesaid objects of the invention and other objects which will become apparent as the description proceeds are achieved in a memory storage element by the combination of a pair of single aperture magnetic cores, means to individually set a desired flux pattern into each respective core, means to subject each core to a common interrogate magnetic field substantially perpendicular to the axis thereof, and means to simultaneously sense flux changes in portions of each core substantially perpendicular to the interrogate magnetic field and measure the changes in series whereby opposite changes cancel each other and similar changes add together.

For a better understanding of the invention reference should be had to the accompanying drawings, wherein:

FIGURE 1 is a schematic view of a single aperture memory storage element adapted for cross-field switching techniques to provide signal outputs on a sense line;

FIGURE 2 is a schematic illustration of a memory storage device which consists of two single aperture elements similar to the element of FIGURE 1 which are wired so as to provide a selective readout or not, as desired;

FIGURE 3 is a truth table indicating when readout will be achieved according to the information stored in the single aperture memory storage elements of FIGURE 2; and FIGURE 4 is a schematic chart illustrating when the flux pattern stored in one of the cores will provide readout information, and when this information will prevent readout.

While it should be understood that this particular memory storage device may be adaptable to any type of logical approach or core structure, it is generally thought to be adapted to an associative memory storage system and operation with a single aperture core and hence it has been illustrated as an individual device without applicability to any particular system.

With reference to FIGURE 1 of the drawings which represents a substantially conventional toroidal single aperture core indicated by numeral 1 with a write/clear line 2 passed therethrough for setting desired flux patterns in the core of changing flux patterns therein, all in the conventional manner. In order to provide the cross-field switching techniques, an interrogate line 3 is passed therearound in a solenoidal fashion. This interrogate line 3, upon passage of a current pulse therethrough, creates an interrogate magnetic field directed substantially perpendicular to the axis of the core, or along a direction indicated by the double ended arrow 4. The flux change occurring in the core 1 as a result of the interrogate magnetic field 4 may be sensed by a sense line 5 measuring the flux change in that portion of the core substantially perpendicular to the interrogate magnetic field 4.

Then, if the core 1 is under the influence of a constant bias external magnetic field $H_E$ directed parallel to the interrogate magnetic field 4 and supplied by appropriate permanent or electromagnets, the detection of the flux change caused by the interrogate magnetic field can be read out to determine the Exclusive OR or Equality functions, as more fully defined in application Ser. No. 387,-824 set forth above.

FIGURE 2 illustrates a pair of single aperture toroidal magnetic cores 6 and 7 which are each provided with separate write/clear lines 8 and 9, respectively. A common interrogate line 10 is passed in solenoidal fashion about both cores 6 and 7. A sense line 12 is wrapped around that portion of both cores 6 and 7 substantially perpendicular to the magnetic field which may be applied by the interrogate line 10, with the line 12 connecting the cores 6 and 7 in series. For a better understanding of the two core structure, we might consider that the core 6 acts as the core to store the desired bit of information while core 7 acts as the core to determine whether or not readout will occur on sense line 12 upon a proper current pulse through the interrogation line 10.

In order to more fully understand the operation of the memory storage device consisting of the two single aperture toroidal cores 6 and 7 in FIGURE 2, certain terminology should be clarified. Hereinafter, we will refer to the functions provided by the overall memory storage element as the "care" and the "don't care" functions. The "care" function refers to that interrogation phase where an output signal is detected on the sense line 12, whereas the "don't care" function is where no output signal is detected on the sense line during an interrogation phase. Again, with the necessary external magnetic field $H_E$, the signal detected on the sense line will determine the "Exclusive OR" or "Equality" function as set forth in the above-identified patent application. Thus, the charts and terminology set forth below will use the "care" and "don't care" language to describe the functions of the device. A and B represent binary 1 information signals while $\overline{A}$ and $\overline{B}$ will represent binary 0 information. Naturally the information is stored as flux patterns in the cores.

Using conventional computer techniques, B and $\overline{B}$ information may be stored in the cores 6 and 7 as desired. For example, according to the chart of FIGURE 3, suppose that a core 6 is set with a B information which might represent a clockwise flux pattern in the core. In this case 1, the core 7 might be set to the same clockwise flux pattern which would indicate a "care" relationship. In other words, upon interrogation of core 6 with a current pulse representing an A through the interrogate line 10 a plus output will be detected on the sense line 12 since the output sensed on the core 7 will be in the same direction as the output sensed on the core 6 so that the two outputs will add together in a summation to provide the plus output on the sense line 12. The same situation is present in case 5 except that core 7 is set in the opposite or counterclockwise flux pattern to provide a "don't care" relationship with the core 6. In this instance, upon interrogation with a current pulse representing an A bit of information through the interrogate line 10, the sensed output on the sense line 12 will be ZERO. This occurs because the direction of current induced into the sense line 12 from the core 7 will be in an opposite sense to that current induced from the core 6 since both cores are in opposite flux patterns. The oppositely directed currents will cancel leaving no output on the sense line 12.

Similar situations are readily seen to occur with respect to the remaining cases shown in FIGURE 3. It should be noted that minus output signals are sensed on the sense line 12 only where A and $\overline{B}$, and $\overline{A}$ and B are interrogated with the core 7 set in a "care" relationship. FIGURE 4 more clearly illustrates what relationship the core 7 takes for the "care" and "don't care" relationship. For example, a B may represent a clockwise flux pattern 20 in core 6 so a similar clockwise flux pattern 21 is set in core 7 to indicate the "care" relationship. Conversely, a counterclockwise flux pattern 22 may indicate a $\overline{B}$ bit of information set in core 6 so that a similar counterclockwise flux pattern 23 is set in core 7 to indicate a "care" relationship. With a clockwise flux pattern 24 set in core 6 to indicate a B bit of information, a counterclockwise flux pattern 25 set in the core 7 will provide the "don't care" relationship. Conversely, with a counterclockwise flux pattern 26 set in core 6 to represent a $\overline{B}$ bit of information, a clockwise flux pattern 27 set in core 7 will provide the desired "don't care" relationship.

It should be understood that the proper relationship between the cores 6 and 7 is determined by the flux patterns set therein on their individual write/clear lines 8 and 9. If, for example, it were desired to mask off certain portions of a particular word stored in memory, or certain individual bits like the most significant or least significant bit, the "don't care" function relationship between the two single aperture cores may be set by simply setting one of the cores with an opposite flux pattern from the other.

Thus, it is seen that the objects of the invention are achieved by providing a memory storage device which consists of two single aperture storage elements, each provided with a separate write/clear feature, but both interrogated by the same magnetic field and the sensed flux changes added or cancelled in series on a common sense line. The "care" or "don't care" functional relationship may be set between the cores as selectively desired by the individual setting of the flux patterns therein through the separate write/clear lines.

In accordance with the Patent Statutes only one best known embodiment of the invention has been illustrated and described in detail, but it is to be understood that the limit and scope of the invention is not to be limited thereto or thereby, but that the inventive scope is defined in the appended claims.

What is claimed is:

1. In a memory storage device the combination of
a pair of single aperture magnetic permeable cores,
means to individually set a desired flux pattern into each respective core,
means to simultaneously subject each core to a common interrogate magnetic field substantially perpendicular to the axis thereof,
means to simultaneously apply a constant external bias magnetic field parallel to the interrogate field, and uniformly saturating a short section of each core,
means to simultaneously sense flux changes in such short sections of each core substantially perpendicular to the interrogate magnetic field and measure said changes in series.

2. A memory storage device according to claim 1 where the cores are toroidal, where the means to subject each core to a common interrogate magnetic field is supplied by a solenoidal type winding passed in the same relationship around each core which may selectively pass a current pulse therethrough to create the desired magnetic field surrounding the cores, where the bias magnetic field is supplied by a permanent magnet to provide a constant magnetic bias to the short sections of each core.

3. In a memory storage device for storing a single bit of information the combination of
a pair of magnetic permeable cores,
means to individually set a desired flux pattern into each respective core,
means to simultaneously subject each core to a common interrogate magnetic field in the same relationship to each core, after selective storage of information therein, and
means to simultaneously sense flux changes in similar portions of each core substantially perpendicular to the interrogate magnetic field and measure said changes in series.

4. A memory storage device according to claim 3 where the cores are toroidal and where the means to subject each core to a common interrogate magnetic field is supplied by a solenoidal type winding passed in the same relationship around each core which may selectively pass a current pulse therethrough to create the desired magnetic field, whereby opposite flux changes in the cores cancel each other and similar changes add together when measured in series.

References Cited

UNITED STATES PATENTS

| | | | |
|---|---|---|---|
| 3,214,741 | 10/1965 | Tillman | 340—174 |
| 3,287,712 | 11/1966 | Hewitt | 340—174 |
| 3,295,115 | 12/1966 | Snyder | 340—174 |
| 3,354,444 | 11/1967 | Franks et al. | 340—174 |

BERNARD KONICK, *Primary Examiner.*

VINCENT P. CANNEY, *Assistant Examiner.*